United States Patent
Park et al.

(10) Patent No.: US 12,199,249 B2
(45) Date of Patent: Jan. 14, 2025

(54) SECONDARY BATTERY INCLUDING CAP SURROUNDING END OF ELECTRODE ASSEMBLY AND HAVING HOLE FOR TAB BUNDLE

(71) Applicant: LG Energy Solution, Ltd., Seoul (KR)

(72) Inventors: Jae Sung Park, Daejeon (KR); Bong Keun Kwon, Daejeon (KR); Kyoung Min Bae, Daejeon (KR); Jin Woong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/434,285

(22) Filed: Feb. 6, 2024

(65) Prior Publication Data
US 2024/0405297 A1 Dec. 5, 2024

(30) Foreign Application Priority Data

Jun. 2, 2023 (KR) .................. 10-2023-0071471
Dec. 12, 2023 (KR) .................. 10-2023-0180156

(51) Int. Cl.
*H01M 10/42* (2006.01)
*H01M 10/052* (2010.01)
(Continued)

(52) U.S. Cl.
CPC ..... *H01M 10/4235* (2013.01); *H01M 10/052* (2013.01); *H01M 10/058* (2013.01);
(Continued)

(58) Field of Classification Search
CPC ........... H01M 10/4235; H01M 10/052; H01M 10/058; H01M 50/531; H01M 50/178;
(Continued)

(56) References Cited

U.S. PATENT DOCUMENTS 6,743,546 B1  6/2004 Kaneda et al.
2007/0231685 A1  10/2007 Takeuchi et al.
(Continued)

FOREIGN PATENT DOCUMENTS

CN  207977393 U  * 10/2018
CN  112886106 A  * 6/2021  ............ H01M 10/48
(Continued)

OTHER PUBLICATIONS

"Vicinity." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1304130. (Year: 2010).*
(Continued)

*Primary Examiner* — Sean P Cullen
(74) *Attorney, Agent, or Firm* — Lerner David LLP

(57) ABSTRACT

A secondary battery includes a unit cell including an electrode assembly provided with a tab bundle and having a round portion, and a cap member in the vicinity of the round portion of the electrode assembly. The cap member includes a pair of first surfaces which are parallel to an upper surface and a lower surface of the electrode assembly, a pair of second surfaces which are parallel to both side surfaces of the electrode assembly, one third surface which connects the pair of first surfaces and the pair of second surfaces, and a contact member provided in an internal space formed by the pair of first surfaces, the pair of second surfaces, and the one third surface and in contact with the round portion of the electrode assembly. The third surface is provided with a through hole through which the tab bundle passes.

16 Claims, 11 Drawing Sheets

(51) Int. Cl.
- *H01M 10/058* (2010.01)
- *H01M 50/105* (2021.01)
- *H01M 50/178* (2021.01)
- *H01M 50/211* (2021.01)
- *H01M 50/264* (2021.01)
- *H01M 50/531* (2021.01)

(52) U.S. Cl.
CPC ....... *H01M 50/105* (2021.01); *H01M 50/178* (2021.01); *H01M 50/211* (2021.01); *H01M 50/264* (2021.01); *H01M 50/531* (2021.01)

(58) Field of Classification Search
CPC . H01M 50/105; H01M 50/264; H01M 50/211
USPC .......................... 429/156, 163, 177, 178, 179
See application file for complete search history.

(56) References Cited

U.S. PATENT DOCUMENTS

| | | | |
|---|---|---|---|
| 2011/0189534 A1 | 8/2011 | Kim et al. | |
| 2015/0064540 A1* | 3/2015 | Roh | H01M 50/262 |
| | | | 429/153 |
| 2018/0190952 A1* | 7/2018 | Kim | H01M 10/52 |
| 2019/0237811 A1 | 8/2019 | Park et al. | |
| 2019/0319253 A1* | 10/2019 | An | H01M 50/103 |
| 2020/0381680 A1 | 12/2020 | Kang et al. | |
| 2024/0006693 A1* | 1/2024 | Wu | H01M 50/3425 |

FOREIGN PATENT DOCUMENTS

| | | | |
|---|---|---|---|
| JP | 2004234899 A | * | 8/2004 |
| JP | 3602797 B2 | | 12/2004 |
| JP | 5197103 B2 | | 5/2013 |
| JP | 5252937 B2 | | 7/2013 |
| JP | 2022067753 A | * | 5/2022 |
| KR | 100847545 B1 | | 7/2008 |
| KR | 20080064917 A | | 7/2008 |
| KR | 2011-0090578 A | | 8/2011 |
| KR | 20160075468 A | | 6/2016 |
| KR | 20160131360 A | | 11/2016 |
| KR | 2018-0109478 A | | 10/2018 |
| KR | 102407634 B1 | | 6/2022 |
| KR | 102538690 B1 | | 6/2023 |

OTHER PUBLICATIONS

"Source." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1292545. (Year: 2010).*

International Search Report for Application No. PCT/KR2024/002624 mailed Jun. 14, 2024, pp. 1-3. [See p. 2, categorizing the cited references].

* cited by examiner

SECONDARY BATTERY INCLUDING CAP SURROUNDING END OF ELECTRODE ASSEMBLY AND HAVING HOLE FOR TAB BUNDLE

CROSS-REFERENCE TO RELATED APPLICATIONS

This application is based on and claims priority from Korean Patent Application Nos. 10-2023-0071471 and 10-2023-0180156, filed on Jun. 2, 2023 and Dec. 12, 2023, respectively, with the Korean Intellectual Property Office, the disclosures of which are incorporated herein in their entireties by reference.

TECHNICAL FIELD

The present disclosure relates to a unit cell equipped with a cap member and a secondary battery including the same.

BACKGROUND

The demand for secondary batteries capable of storing produced electrical energy has been increasing due to the air pollution caused by the use of the fossil fuels and the development of alternative energy due to energy depletion.

The required capacity of secondary batteries, which are used as energy sources for various electronic devices indispensable in modern society, is increasing due to an increase in the use amount and complexity of mobile devices and the development of electric vehicles. In order to fulfill the user demand, multiple battery cells are disposed in devices having relatively small sizes, but for the devices having relatively large sizes such as automobiles, and the like, battery modules which electrically connect multiple battery cells or battery packs provided with multiple battery modules are used.

Such battery cells are manufactured in various structures to improve cell performance (see, e.g., Korean Patent Laid-Open Publication No. 10-2018-0109478).

SUMMARY

The present disclosure provides a unit cell equipped with a cap member, capable of minimizing generation of lithium by-products during charging and discharging by uniformly controlling the pressure applied to each position of an electrode assembly, and a secondary battery including the same.

A secondary battery according to the present disclosure comprises a unit cell including an electrode assembly 100 provided with a tab bundle 110 and having a round portion 130 formed at an end thereof in a direction in which the tab bundle 110 is located, and a cap member 200 provided in the vicinity of the round portion 130 of the electrode assembly 100. The cap member 200 includes a pair of first surfaces 210 which are directed in parallel to an upper surface and a lower surface of the electrode assembly 100, a pair of second surfaces 220 which are directed in parallel to both side surfaces of the electrode assembly 100, one third surface 230 which connects the pair of first surfaces 210 and the pair of second surfaces 220, and a contact member (or an adhesion member) 240 provided in an internal space formed by the pair of first surfaces 210, the pair of second surfaces 220, and the one third surface 230 and in contact with the round portion 130 of the electrode assembly 100. The third surface 230 is provided with a through hole 231 through which the tab bundle 110 passes.

In the secondary battery of the present disclosure, the contact member 240 is provided with a first space S1 for gas capturing.

In the secondary battery of the present disclosure, the first space S1 has a slit shape formed in a length direction of the contact member 240.

In the secondary battery of the present disclosure, a first space S1 is provided between the third surface 230 and the contact member 240 for gas capturing.

The cap member 200 is made of at least one of an insulating rubber material and a chemically resistant plastic material.

The cap member 200 is styrene-butadiene rubber or acrylonitrile-butadiene rubber.

In the secondary battery of the present disclosure, the unit cell further includes a case 300 for accommodating the electrode assembly 100 on which the cap member 200 is provided.

In the secondary battery of the present disclosure, a plurality of unit cells are stacked and a second space S2 is provided between the electrode assemblies 100.

A fixing agent A is interposed between the first surfaces 210 so that the unit cells are able to be fixed to each other.

The fixing agent A is an adhesive.

In the secondary battery of the present disclosure, the secondary battery is a battery module or a battery pack.

In the secondary battery of the present disclosure, a plurality of unit cells is stacked.

In addition, the secondary battery according to the present disclosure comprises a unit cell including an electrode assembly 100 provided with a tab bundle 110 and having a round portion 130 formed at an end thereof in a direction in which the tab bundle 110 is located, a case 300 for accommodating the electrode assembly 100, and a cap member 200 provided in the vicinity of an outer end of the case 300. The cap member 200 includes a pair of first surfaces 210 which are directed in parallel to an upper surface and a lower surface of the case 300, a pair of second surfaces 220 which are directed in parallel to both side surfaces of the case 300, and one third surface 230 which connects the pair of first surfaces 210 and the pair of second surfaces 220. The third surface 230 includes a through hole 231 through which the tab bundle 110 or an electrode lead 120 extending from the electrode assembly 100 passes.

In the secondary battery of the present disclosure, the cap member includes a contact member which is provided in an internal space formed by the pair of the first surfaces, the pair of the second surfaces, and the one third surface, and is in close contact with an end surface of the case.

The case is a pouch for a lithium secondary battery.

The electrode assembly is a basic structure of a lithium secondary battery including at least one positive electrode, one negative electrode, and one separator.

Additionally, in the secondary battery of the present disclosure, a plurality of unit cells is stacked, and a third space S3 is provided between the electrode assemblies 100.

A fixing agent A is interposed between the first surfaces 210 allowing the unit cells to be fixed to each other.

As described above, the secondary battery according to the present disclosure has an advantage capable of evenly controlling pressure applied to all the surfaces of the electrode assembly by including a cap member in the vicinity of the end of the electrode assembly, which may minimize generation of lithium by-products during charging and discharging of the secondary battery.

The cap member included in the secondary battery according to the present disclosure has an advantage in that it has a space and is able to be used as a pocket for a venting gas.

The cap member included in the secondary battery according to the present disclosure is capable of clearly specifying an external boundary of pouch-type unit cells, allowing an accurate stacking, which has an advantage of reducing product defects.

Figure 1:
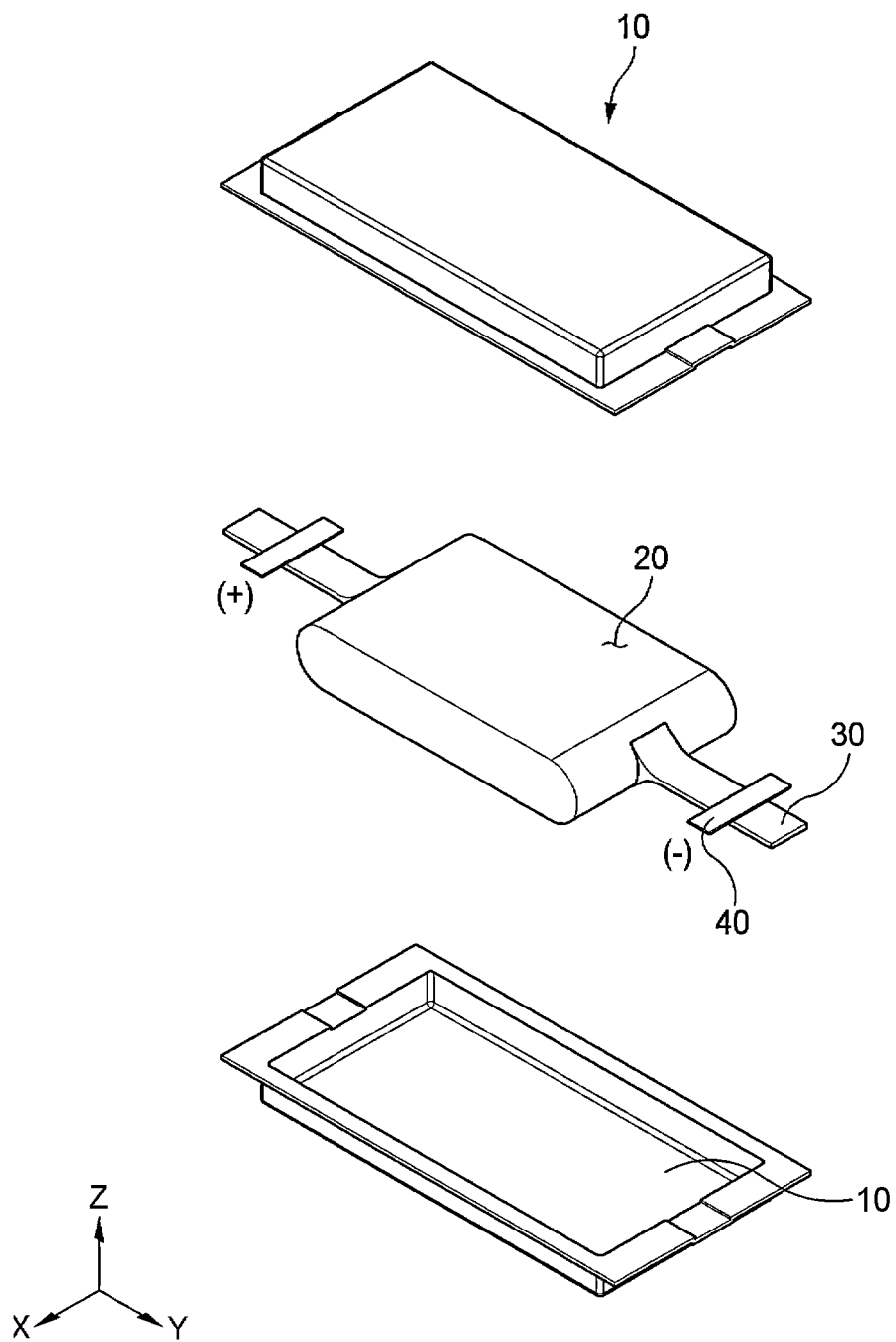
FIG. 1 is an exploded perspective view of a battery cell according to the prior art.

In some of the attached drawings, corresponding components are given the same reference numerals. Those skilled in the art will appreciate that the drawings depict elements simply and clearly and have not necessarily been drawn to scale. For example, to facilitate understanding of various embodiments, the dimensions of some elements illustrated in the drawings may be exaggerated compared to other elements. Additionally, elements of the known art that are useful or essential in commercially viable embodiments may often not be depicted so as not to interfere with the spirit of the various embodiments of the present disclosure.

DETAILED DESCRIPTION

Hereinafter, embodiments in which the present disclosure can be readily implemented by a person skilled in the art will be described in detail with reference to the attached drawings. However, when explaining the operating principle of the embodiments of the present disclosure in detail, if it is determined that a detailed description of a related known function or configuration may unnecessarily obscure the gist of the present disclosure, the detailed description will be omitted.

In addition, the same reference numerals are used for parts that perform similar functions and actions throughout the drawings. Throughout the specification, when a part is said to be connected to another part, this includes not only cases where a part is directly connected to another part, but also cases where a part is indirectly connected to another part through another element in between. Additionally, including a certain component does not mean excluding other components unless specifically stated to the contrary, but rather means that other components may be further included.

FIG. 1 is an exploded perspective view of a battery cell according to the prior art. As illustrated in FIG. 1, a battery cell includes a case 10 in which an accommodation portion is formed, an electrode assembly 20 accommodated in the accommodation portion of the case 10, an electrode lead 30 having one side connected to an electrode tab formed on the electrode assembly 20 and the other side protruding outwardly from the case 10, and an insulating film 40 located at a portion where the electrode tab and the electrode lead 30 are in contact.

In a manufacturing process of the battery cell, for example, when coating an electrode active material, due to fluidity of its slurry, a sliding portion where a thickness of the active material at an end of an electrode is relatively thin compared to that of a central portion thereof inevitably occurs.

Secondary batteries are charged and discharged frequently, and the sliding portion causes a difference in pressure applied to the electrode assembly, which also causes generation of lithium by-products.

In view of the defects caused by the sliding portion of the secondary battery, the present disclosure provides a secondary battery in which a cap member is provided in the vicinity of an end of an electrode assembly, so that the pressure applied to all surfaces of the electrode assembly may be controlled equally, and generation of lithium by-products during charging and discharging of the secondary battery may be minimized.

Hereinafter, a unit cell equipped with a cap member according to the present disclosure and a secondary battery including the same will be described with reference to the attached drawings.

Figure 2:
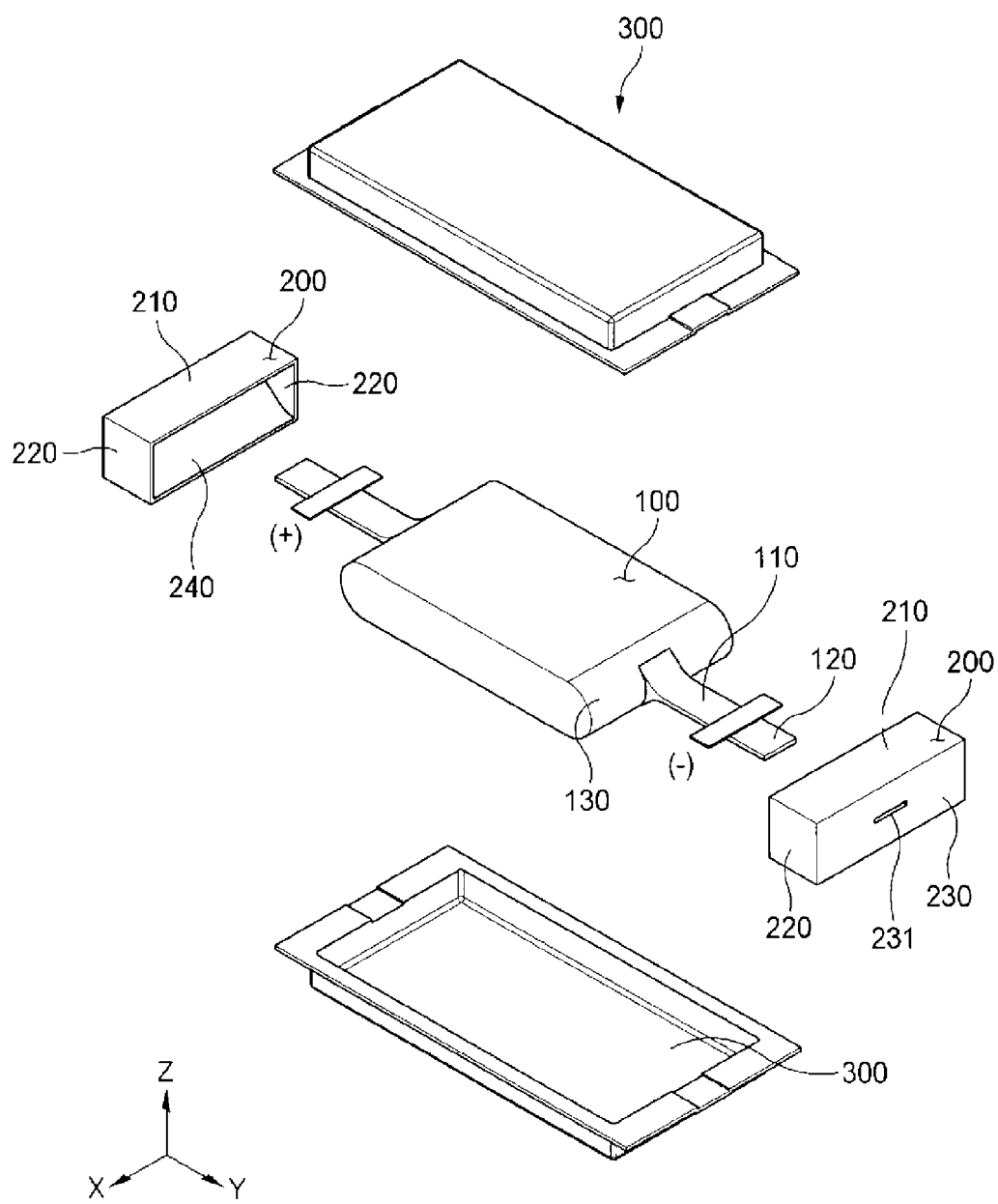
FIG. 2 is an exploded perspective view of a unit cell according to a first embodiment of the present disclosure.
Figure 3:
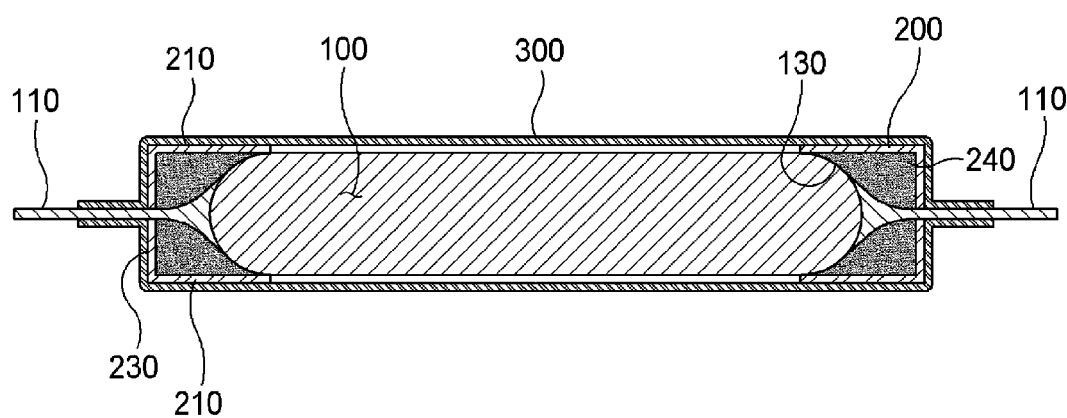
FIG. 3 is a cross-sectional view of the unit cell illustrated in FIG. 2.

FIG. 2 is an exploded perspective view of a unit cell according to a first embodiment of the present disclosure. FIG. 3 is a cross-sectional view of the unit cell illustrated in FIG. 2.

Referring to FIGS. 2 and 3, the unit cell according to the first embodiment of the present disclosure includes an electrode assembly 100, a cap member 200, and a case 300.

According to an embodiment, the electrode assembly 100 may be formed of a jelly-roll type electrode assembly which is wound after a separator is interposed between a positive electrode and a negative electrode having a long sheet shape, a stack-type electrode assembly including unit cells having a structure where a positive electrode and a negative electrode having a rectangular shape are stacked with a separator interposed therebetween, a stack-and-folding type electrode assembly in which unit cells are wound by a long separation film, or a lamination-and-stack type electrode assembly in which unit cells are stacked with a separator interposed therebetween and attached to each other.

For example, the negative electrode is manufactured by applying a slurry mixed with a negative electrode active material and a binder to a negative electrode current collector.

As for the negative electrode active material, for example, carbon such as hard carbon or graphitic carbon; metal complex oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, or Ge; Me': Al, B, P, Si, elements of the groups 1, 2, and 3 of the periodic table, or a halogen; $0<x \leq 1$; $1 \leq y \leq 3$ and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; Li—Co—Ni-based materials; Si, SiO, or $SiO_2$ alone or Si-based materials which are mixtures thereof may be used.

The positive electrode is manufactured by applying a slurry mixed with a positive electrode active material and a binder to a positive electrode current collector.

Also, the positive electrode active material may include a layered compound such as lithium cobalt oxide ($LiCoO_2$) or lithium nickel oxide ($LiNiO_2$), or compounds substituted with one or more transition metals; lithium manganese oxides represented by Chemical Formula $Li_{1+x}Mn_{2-x}O_4$ (where, x is 0 to 0.33), $LiMnO_3$, $LiMn_2O_3$, or $LiMnO_2$; lithium copper oxides ($Li_2CuO_2$); vanadium oxides such as $LiV_3O_8$, $V_2O_5$, and $Cu_2V_2O_7$; Ni-site type lithium nickel oxides represented by Chemical Formula $LiNi_{1-x}MxO_2$ (where, M is Co, Mn, Al, Cu, Fe, Mg, B, or Ga, and x is 0.01 to 0.3); lithium manganese composite oxides represented by Chemical Formula $LiMn_{2-x}MxO_2$ (where, M is Co, Ni, Fe, Cr, Zn, or Ta, and x is 0.01 to 0.1) or $Li_2Mn_3MO_8$ (where, M is Fe, Co, Ni, Cu, or Zn); $LiMn_2O_4$ wherein a portion of Li is substituted with alkaline earth metal ions; disulfide compounds; and $Fe_2(MoO_4)_3$.

Meanwhile, the negative electrode current collector and the positive electrode current collector are made up of a part to which the slurry mixed with the active material is applied and an uncoated part to which the slurry is not applied. The uncoated part is cut and a separate conductive member is connected to the uncoated part by, for example, ultrasonic welding to form an electrode tab, and these electrode tabs are gathered to form a tab bundle 110.

A pair of electrode leads 120 including a positive electrode lead and a negative electrode lead, are electrically connected to the tab bundle 110 including a positive electrode tab and a negative electrode tab, respectively, of the electrode assembly 100 and are exposed to the outside of the case 300.

At the end of the electrode assembly in a direction where the tap bundle 110 is located, loading is lowered due to fluidity of the active material in a slurry state, resulting in a sliding phenomenon, which forms a round portion 130 with a certain curvature.

The cap member 200 according to an embodiment of the present disclosure is configured to cover the round portion 130 of the electrode assembly 100, for example, the round portion 130 at the end of the electrode assembly in the direction where the tab bundle 110 is located, so that pressure transferred to all surfaces of the electrode assembly 100 is uniform regardless of a position thereof. Meanwhile, the above-described electrode assembly 100 may be a basic structure of a lithium secondary battery including at least one positive electrode, one negative electrode, and one separator.

The cap member 200 includes first surfaces 210, second surfaces 220, a third surface 230, and a contact member 240.

For example, the first surfaces 210 of the cap member 200 are formed of a pair of first surfaces 210 and are located to be parallel to an upper surface and a lower surface of the end, respectively, based on a full-length direction (Y-axis) of the electrode assembly 100. The second surfaces 220 of the cap member 200 are formed of a pair of second surfaces 220 and are located parallel to both side surfaces of the end, respectively, based on a full-width direction (X-axis) of the electrode assembly 100. The third surface 230 is located parallel to a thickness direction (Z-axis) of the electrode assembly 100 and is connected to the pair of first surfaces 210 and the pair of second surfaces 220.

In summary, the cap member 200 has a hexahedral shape in which an inner portion is empty and one side is opened by the first surfaces 210, the second surfaces 220, and the third surface 230.

The third surface 230 is provided with a through hole 231 which is cut with a certain width to allow the tab bundle 110 of the electrode assembly 100 to pass therethrough and project outward.

In accordance with an embodiment, the contact member 240 of the cap member 200 is provided in an internal space formed by the first surfaces 210, the second surfaces 220, and the third surface 230 of the cap member 200 and is configured to be in close contact with all side surfaces of the round portion 130 of the electrode assembly 100. Thus, one surface of the contact member 240 of the cap member 200 is formed in the same shape as that of the round portion 130 to receive the round portion 130 of the electrode assembly 100, and remaining surfaces of the contact member 240 are shaped to be in contact with the first surfaces 210, the second surfaces 220, and the third surface 230 of the cap member 200.

Since the cap member 200 configured by the first surfaces 210, the second surfaces 220, the third surface 230, and the contact member 240 covers the vicinity of the end of the electrode assembly 100, the cap member 200 may be made of one or more of an insulating rubber material and a chemical-resistant plastic material.

The insulating rubber material may be, for example, styrene butadiene rubber or acrylonitrile butadiene rubber, but is not limited thereto if the insulating rubber material is capable of performing the same function.

Also, the chemical-resistant plastic material may include, for example, one or more of polyvinyl chloride (PVC), polypropylene (PP), polyethylene terephthalate (PET), and polyolefine, but is not limited thereto if the chemical-resistant plastic material is a material capable of performing the same function.

Meanwhile, since the cap member 200 is mounted on the end of the electrode assembly 100 and then, they are accommodated in the case 300, there is no need to use a separate contact member for fixing the cap member 200. However, when applying an adhesive to an inner surface of the contact member 240, the contact member 240 may be more securely fixed to the round portion 130.

The cap member 200 having the above configuration is provided on the round portion 130 of the electrode assembly 100, so that it is possible to reduce a deviation in pressure that occurs at each position of the electrode assembly 100 and consequently, to minimize generation of lithium by-products that may occur during charging and discharging of the second battery.

The case 300 may be made up of an upper case and a lower case and is provided with a pocket-shaped accommodation portion to accommodate the electrode assembly 100 on which the cap member 200 is mounted.

This case 300 forms an accommodation portion using a laminated sheet formed of an outer resin layer, a metal layer, and an inner resin layer.

The external resin layer is located on an outside of the case 300, and this external resin layer may be formed using a heat-resistant polymer having excellent tensile strength, moisture permeation prevention, and air penetration prevention properties to protect the electrode assembly 100 and ensure heat resistance and chemical resistance, for example, using nylon or polyethylene terephthalate.

The metal layer in contact with the external resin layer corresponds to a barrier layer which prevents moisture or various gases from penetrating into the battery from the outside, and a material for the metal layer may be a lightweight aluminum thin film with excellent formability.

In addition, since the inner resin layer is in direct contact with the electrode assembly 100, it should have electrolytic resistance and insulating properties and have excellent sealing properties for sealing from the outside, for example, a sealing area where the inner layers are thermally bonded to each other.

A material of the inner resin layer may be selected from among polyolefin resin such as polypropylene, polyethylene, polyethylene acrylic acid, or polybutylene, polyurethane resin, and polyimide resin, which have excellent chemical resistance and good sealing properties, and polypropylene, which has excellent chemical resistance and mechanical properties such as tensile strength, rigidity, surface hardness, and impact resistance, may be used therefor.

In the unit cell of FIG. 2, although it is illustrated that the accommodation portion is provided in both the upper case and the lower case, and four sealing surfaces for sealing the upper case and the lower case are provided, the accommodation portion may be provided only in the upper case or the lower case. In addition, three sealing surfaces may be configured by connecting one surface of the upper case and one surface of the lower case to each other.

Also, it is illustrated that a pair of electrode tabs is located in both directions, but this is just an example. The unit cell may be a unidirectional unit cell in which a pair of electrode tabs is located in the same direction, and in this case, two through holes may be formed in a surface of the cap member 200.

Figure 4:
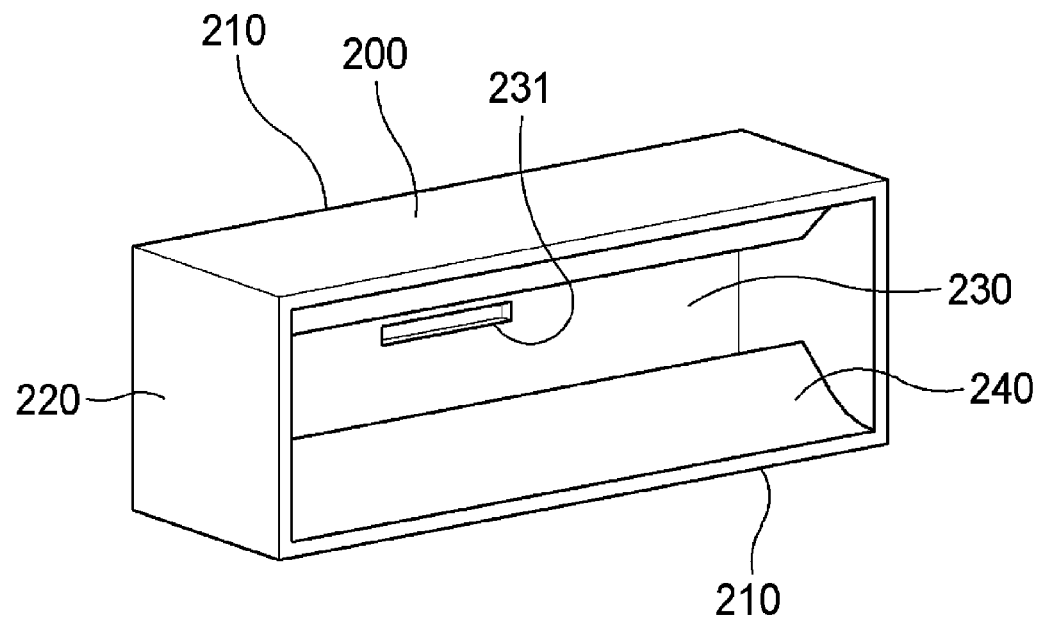
FIG. 4 is a perspective view illustrating a first modified example of a cap member which is mounted on the unit cell according to the first embodiment of the present disclosure.
Figure 5:
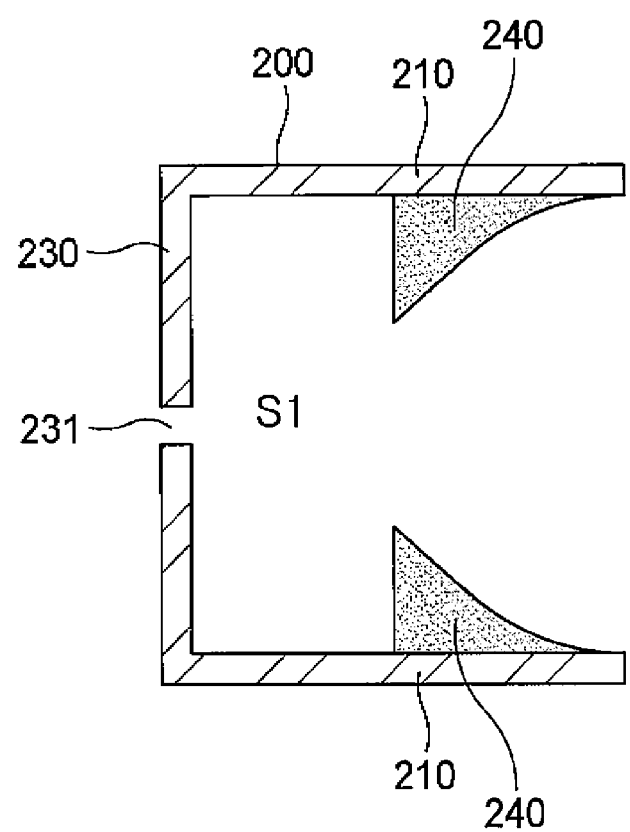
FIG. 5 is a cross-sectional view of the cap member illustrated in FIG. 4.

FIG. 4 is a perspective view illustrating a first modified example of a cap member mounted on the unit cell according to the first embodiment of the present disclosure, and FIG. 5 is a cross-sectional view of the cap member illustrated in FIG. 4.

Referring to FIGS. 4 and 5, since the first modified example of the cap member is similar to the cap member of the first embodiment described in FIGS. 2 and 3 except for the shape of a part thereof, descriptions will be made only on different configurations from the first embodiment.

The cap member 200 according to the first modified example is formed so that the third surface 230 and the contact member 240 are spaced apart by a certain distance to form a first space S1 between the third surface 230 and the contact member 240. This first space S1 may be utilized as a space for capturing gases generated during charging and discharging of the secondary battery, which has advantages of reducing the deviation in pressure applied to the electrode assembly and delaying or preventing case breakage due to gas expansion.

Figure 6:
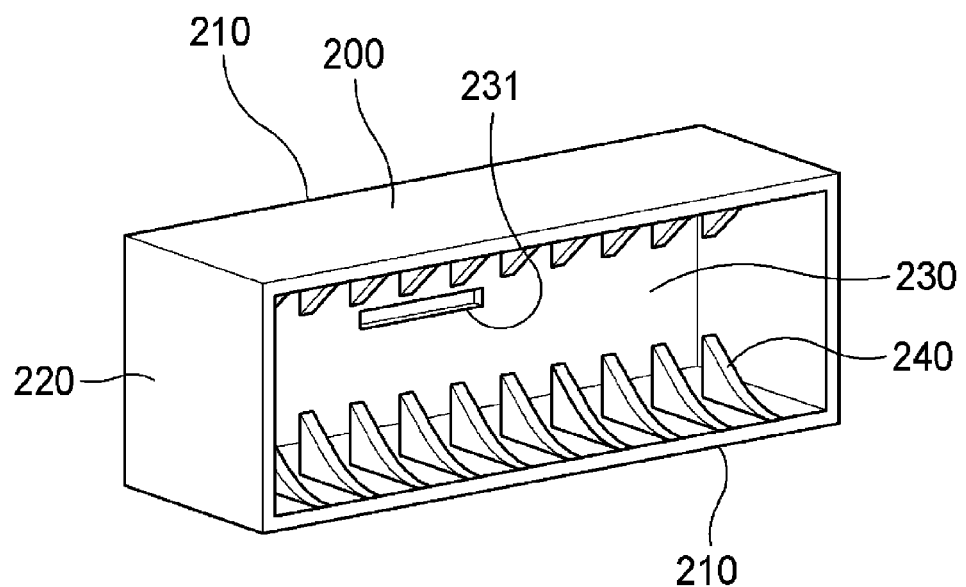
FIG. 6 is a perspective view illustrating a second modified example of the cap member which is mounted on the unit cell according to the first embodiment of the present disclosure.
Figure 7:
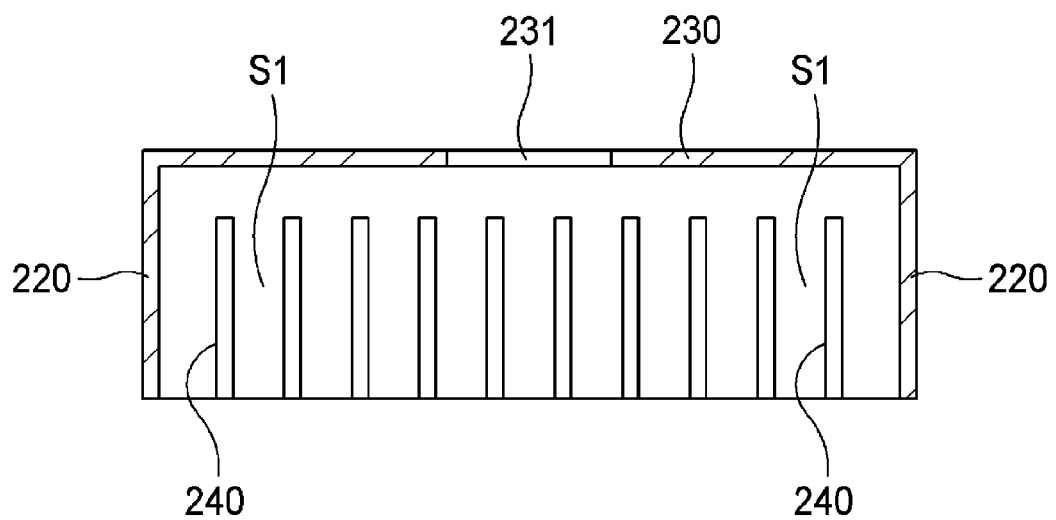
FIG. 7 is a cross-sectional view of the cap member illustrated in FIG. 6.

FIG. 6 is a perspective view illustrating a second modified example of the cap member 200 mounted on the unit cell according to the first embodiment of the present disclosure, and FIG. 7 is a cross-sectional view of the cap member illustrated in FIG. 6.

Referring to FIGS. 6 and 7, since the second modified example of the cap member 200 is similar to the cap member of the first embodiment described in FIGS. 2 and 3, except for a shape of a part thereof, descriptions will be made only on different configurations from the first embodiment.

The contact member 240 of the cap member 200 according to the second modified example is provided with the first space S1. For example, the first space S1 having a slit shape along the length direction of the contact member 240 is provided, so that it is possible to reduce a deviation in pressure applied to the electrode assembly along with providing a function of capturing gases generated during charging and discharging of the secondary battery.

Figure 8:
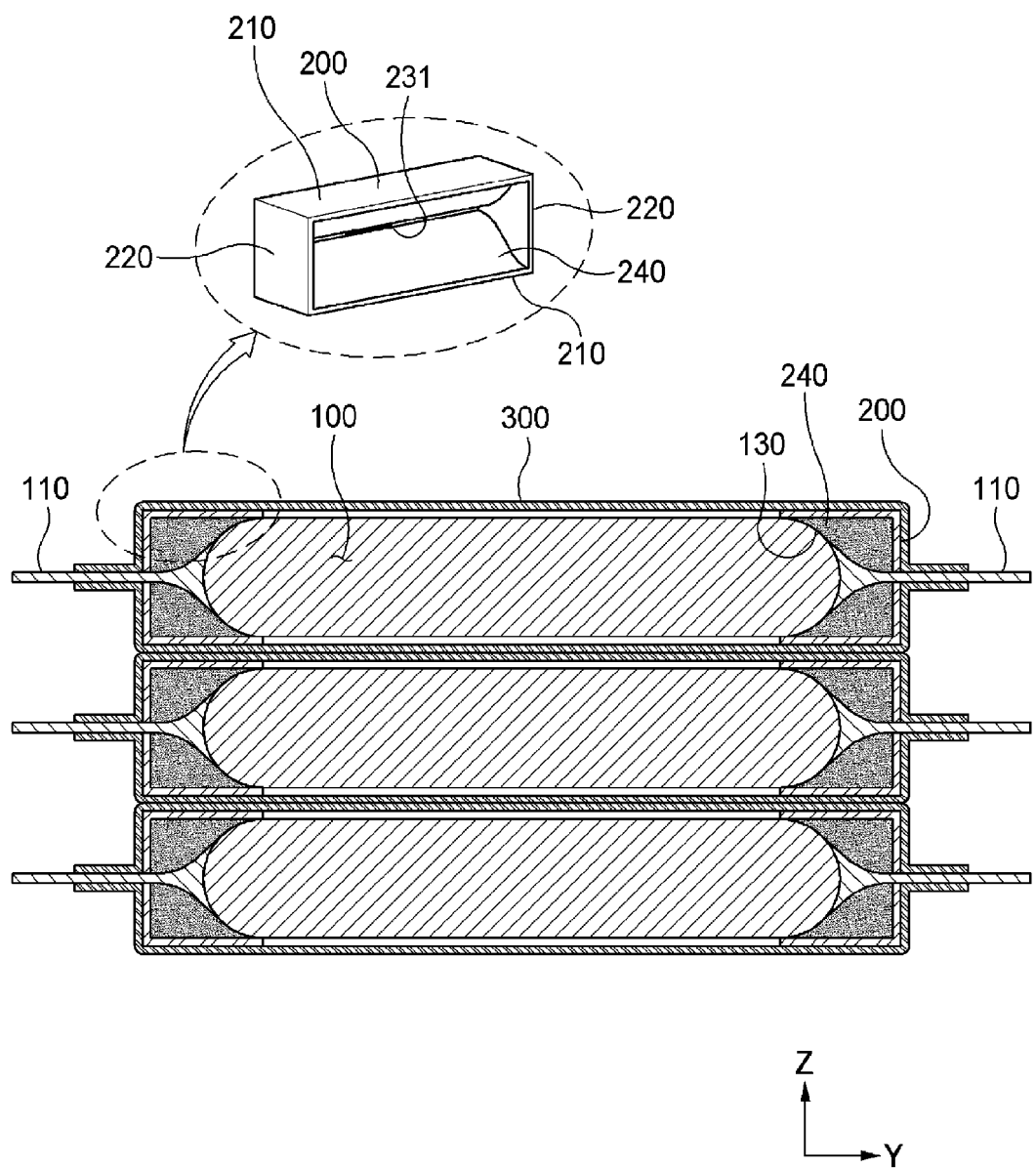
FIG. 8 is a first example of a cross-sectional view of a secondary battery illustrating a state in which unit cells according to the first embodiment of the present disclosure are stacked.

FIG. 8 is a first example of a cross-sectional view of a secondary battery illustrating a state in which unit cells according to the first embodiment of the present disclosure are stacked.

Referring to FIG. 8, a plurality of unit cells described with reference to FIGS. 2 and 3 may be stacked to form a battery module or battery pack.

Since the cap members 200 are accommodated together within the case 300, an overall thickness of each unit cell is uniform and an outer boundary of the unit cell is clear, facilitating a stacking process for a cell module or cell pack.

Figure 9:
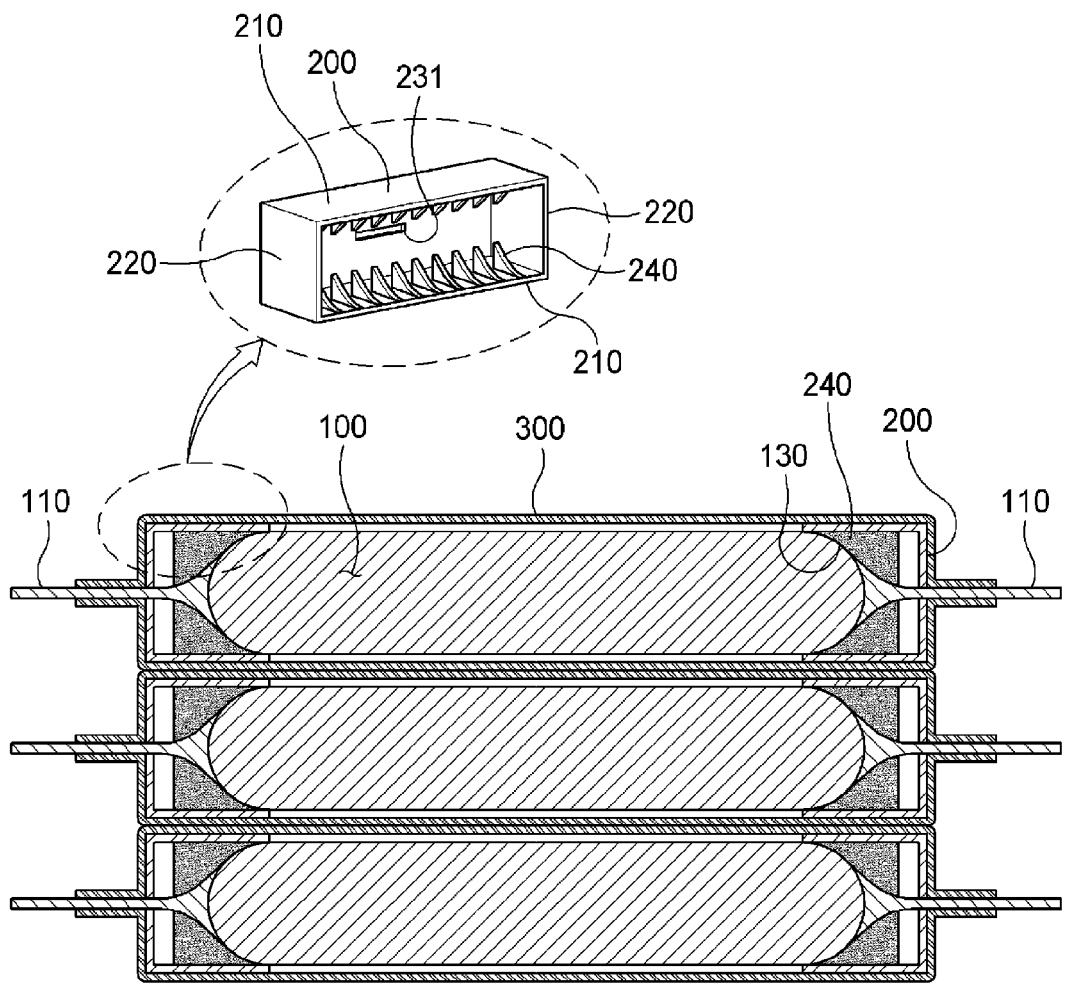
FIG. 9 is a second example of a cross-sectional view of a secondary battery illustrating a state in which unit cells according to a second modified example of the first embodiment of the present disclosure are stacked.

FIG. 9 is a second example of a cross-sectional view of a secondary battery illustrating a state in which unit cells according to a second modified example of the first embodiment of the present disclosure are stacked. The plurality of unit cells described above with reference to FIGS. 6 and 7 may be stacked to form a battery module or battery pack. For example, in a stack structure of the unit cells according to the second modified example illustrated in FIG. 9, the cap member 200 described in FIGS. 6 and 7, for example, the cap member 200 in a form in which the first space S1 having a slit shape is provided along the length direction of the contact member 240, is applied. Thus, similarly to the case in FIG. 8, it is possible to reduce the deviation in pressure applied to the electrode assembly along with providing a function of capturing gases generated during charging and discharging of the secondary battery.

Figure 10:
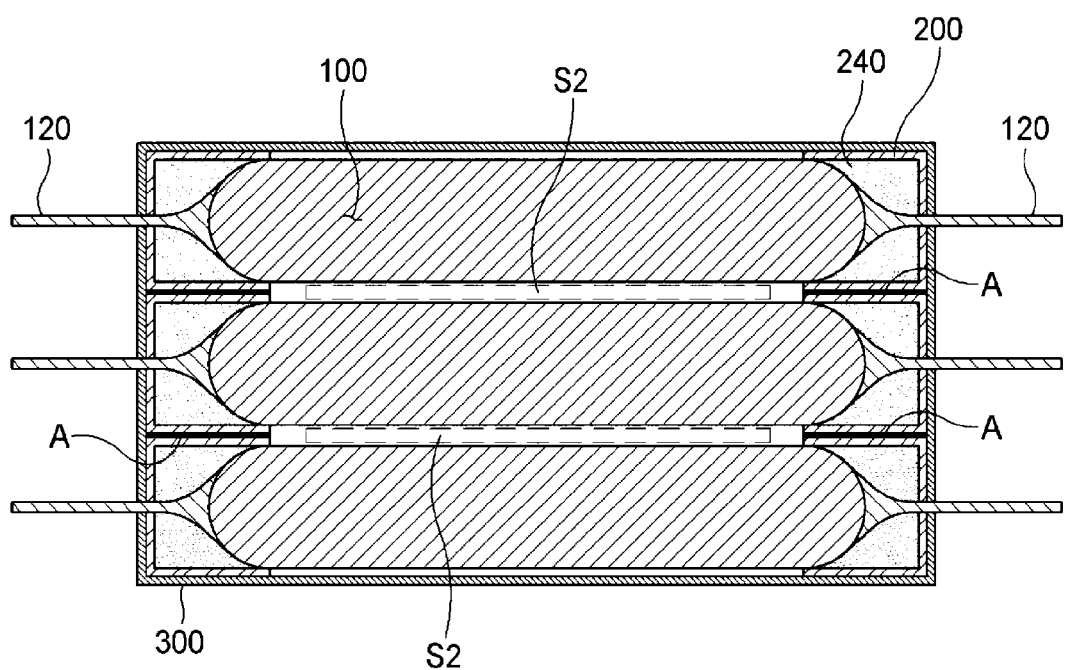
FIG. 10 is a third example of a cross-sectional view of a secondary battery illustrating a state in which unit cells according to the first embodiment of the present disclosure are stacked.
Figure 10:
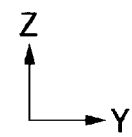

FIG. 10 is a third example of a cross-sectional view of a secondary battery illustrating a state in which unit cells according to the first embodiment of the present disclosure are stacked.

The secondary battery of the third example is a battery module or battery pack including a plurality of unit cells stacked therein, where the cap member 200 according to the first embodiment described in FIGS. 2 and 3 is mounted on the electrode assembly 100, and the case 300 enclosing the multiple unit cells.

Between the first surfaces of the cap members 200, where the cap members 200 are in close contact with each other, a fixing agent A, such as an adhesive, may be interposed to secure the unit cells located adjacent to each other.

In the case of the secondary battery according to the third example described above, a second space S2 is formed between the respective unit cells due to a thickness of the cap member 200, and therefore, may be utilized as a buffer space in the event of swelling occurrence, as well as for function as a gas capturing space.

In addition, the plurality of unit cells including each of the electrode assemblies 100 and the cap members 200 are accommodated in one case 300, so that it is possible to reduce manufacturing costs and improve energy density due to a decrease in an overall weight.

Although not illustrated in the drawings, it is also possible to form a battery module or battery pack by stacking a plurality of unit cells in which the cap member 200 according to the first modified example or second modified example is mounted on the electrode assembly.

Figure 11:
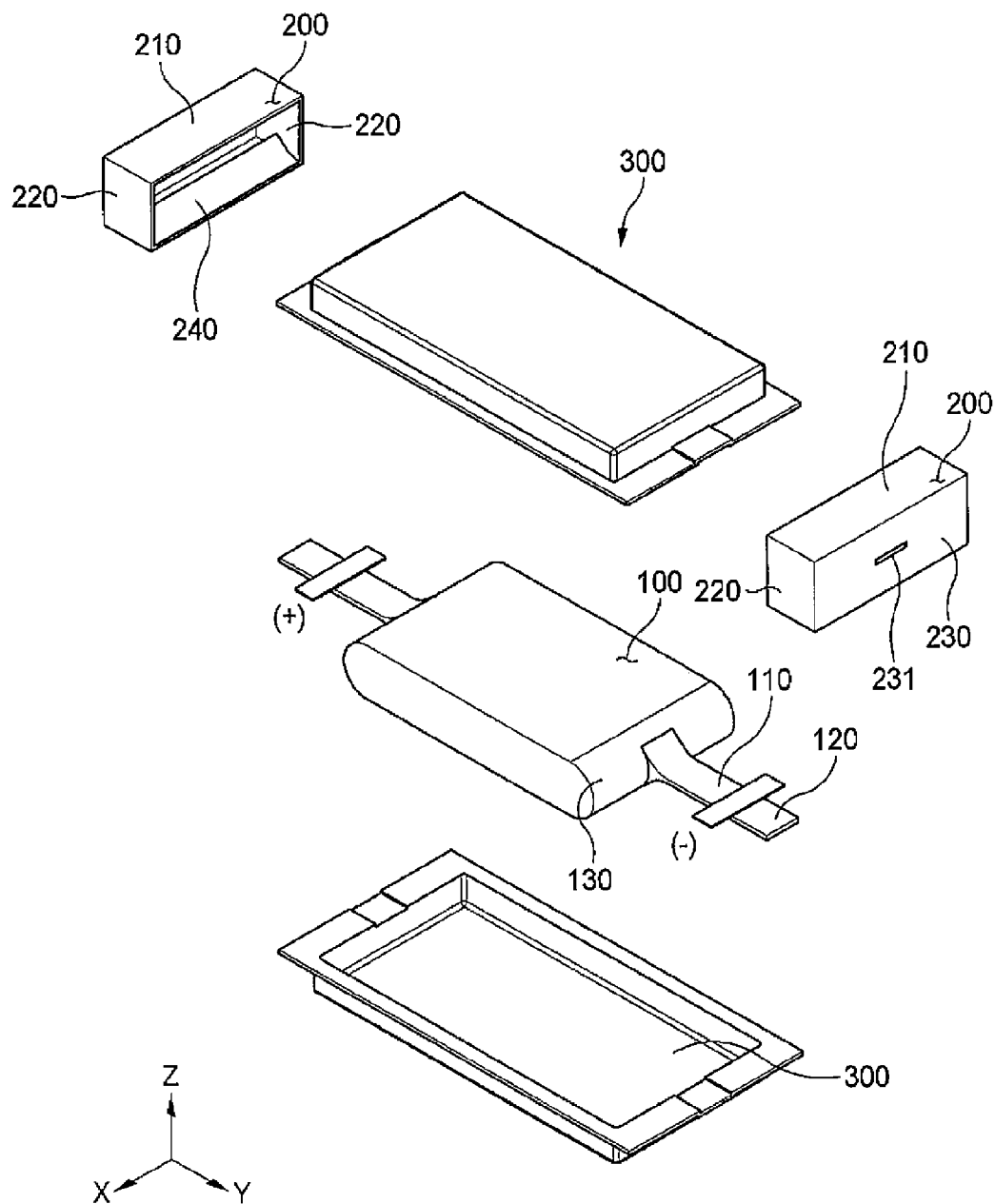
FIG. 11 is an exploded perspective view of a unit cell according to a second embodiment of the present disclosure.
Figure 12:
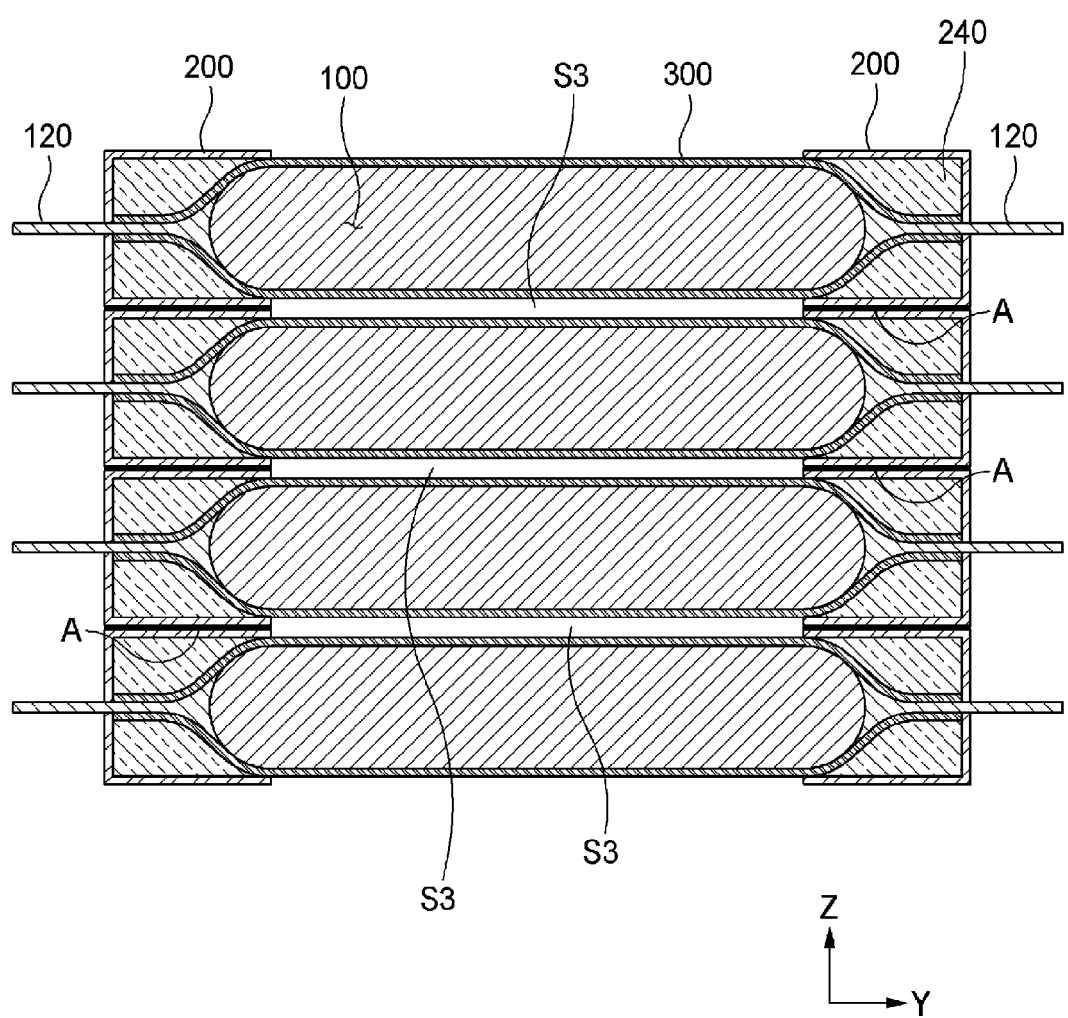
FIG. 12 is a cross-sectional view of a secondary battery illustrating a state in which unit cells according to the second embodiment of the present disclosure are stacked.

FIG. 11 is an exploded perspective view of a unit cell according to a second embodiment of the present disclosure. FIG. 12 is a cross-sectional view of a secondary battery illustrating a state in which unit cells according to the second embodiment of the present disclosure are stacked.

Since the unit cell according to the second embodiment of the present disclosure is similar to the unit cell according to the first embodiment described in FIGS. 2 and 3 except for a position of the cap member 200, descriptions of the same configurations will be omitted.

In the unit cell of the second embodiment, the cap member 200 is located in the vicinity of an outer end of the case 300. Here, the case 300 may be a pouch for a lithium secondary battery, according to one embodiment.

The cap member 200 includes first surfaces 210, second surfaces 220, a third surface 230, and the contact member 240. For example, the first surfaces 210 of the cap member 200 are formed of a pair of first surfaces 210 and are located to be parallel to an upper surface and a lower surface of an end of the case 300, respectively, based on a full-length direction (Y-axis) of the case 300. The second surfaces 220 of the cap member 200 are formed of a pair of second surfaces 220 and are located parallel to both side surfaces of the end, respectively, based on a full-width direction (X-axis) of the case 300, and the third surface 230 of the cap member 200 is located parallel to a thickness direction (Z-axis) of the case 300 and is connected to the pair of first surfaces 210 and the pair of second surfaces 220.

In summary, the cap member 200 has a hexahedral shape in which an inner portion is empty and one side is opened by the first surfaces 210, the second surfaces 220, and the third surface 230.

The third surface 230 of the cap member 200 is provided with a through hole 231 which is cut with a certain width to allow the tab bundle 110 or the electrode lead 120 of the electrode assembly 100 to pass therethrough and project outward.

The contact member 240 of the cap member 200 is provided in an inner space formed by the first surfaces 210, the second surfaces 220, and the third surface 230, and is in close contact with all surfaces of the end of the case 300. Thus, one surface of the contact member 240 is formed in the same shape as that of the end of the case 300 and remaining surfaces of the contact member 240 are shaped to be in contact with the first surfaces 210, the second surfaces 220, and the third surface 230.

When a battery module or battery pack is formed by stacking a plurality of unit cells with the cap member 200 which is mounted in the vicinity of the outer end of the case 300, a third space S3 is formed between the respective unit cells due to a thickness of the cap member 200.

The third space S3 may be utilized as a buffer space in the event of swelling occurrence, as well as acting as an insulating layer to minimize heat transfer between the unit cells.

Between the first surfaces of the cap members 200, where the cap members 200 are in close contact with each other, a fixing agent A, such as an adhesive, may be interposed to secure the unit cells located adjacent to each other.

Figure 13:
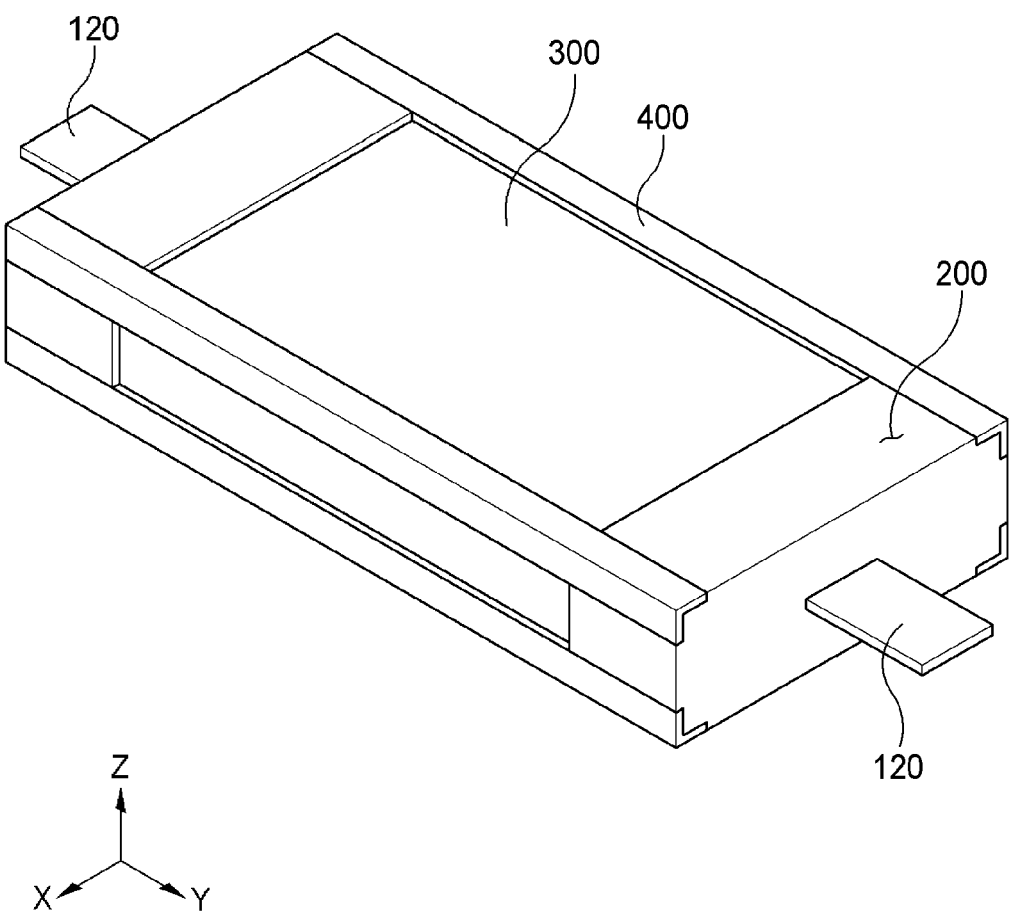
FIG. 13 is a perspective view of a unit cell according to a third embodiment of the present disclosure.

FIG. 13 is a perspective view of a unit cell according to a third embodiment of the present disclosure. The unit cell according to the third embodiment of the present disclosure has a structure similar to that of the unit cell according to the second embodiment described in FIG. 11, except for the structure of the cap member 200.

In the unit cell according to the third embodiment, a pair of the cap members 200 are located to be in close contact with both outer ends of the case 300, respectively, and one or more connection members 400 may be provided to connect portions of the pair of cap members 200 to each other.

The connection members 400 are configured to connect the pair of cap members 200 to each other, thereby preventing the cap members 200 from being separated from each other. The connection members 400 may be made of the same material as that of the cap members 200, and are not particularly limited to taping, clips, hooks, or adhesives, if they are able to connect the pair of cap members 200 to each other.

While the above has been described with reference to embodiments of the present disclosure, it will be understood by those skilled in the art or having ordinary knowledge of the art that various modifications and changes can be made to the present disclosure without departing from the field of thought and skill of the invention as recited in the patent claims, which will be described below. Accordingly, the technical scope of the present disclosure is not limited to what is described in the detailed description of the specification but should be defined by the patent claims.

The invention claimed is:

1. A secondary battery comprising:
a unit cell including an electrode assembly provided with a tab bundle and having a round portion formed at each of two ends thereof in a direction in which the tab bundle is located, a case for accommodating the electrode assembly, and two separate caps, each cap covering an outer end of the case,
wherein each cap includes a pair of first surfaces which are directed in parallel to an upper surface and a lower surface of the case, a pair of second surfaces which are directed in parallel to both side surfaces of the case, and one third surface which connects the pair of first surfaces and the pair of second surfaces, and a contact body provided in an internal space of each cap, the contact body having a round surface arranged to be in contact with the round portion of the electrode assembly, the contact body including another surface spaced from the one third surface,
wherein the third surface has a through hole through which the tab bundle or an electrode lead extending from the electrode assembly passes, and
wherein a first space for gas capturing is provided between the third surface and the another surface of the contact body.

2. The secondary battery according to claim 1, wherein the electrode assembly is a basic structure of a lithium secondary battery including at least one positive electrode, one negative electrode, and one separator.

3. The secondary battery according to claim 1, wherein the contact body is formed by the pair of first surfaces, the pair of second surfaces, and the one third surface and is in contact with an end surface of the case.

4. The secondary battery according to claim 3, wherein the case is a pouch for a lithium secondary battery.

5. The secondary battery according to claim 1, wherein a plurality of unit cells is stacked, and a third space is provided between the electrode assemblies.

6. The secondary battery according to claim 5, wherein a fixing agent is interposed between the first surfaces so that the unit cells are able to be fixed to each other.

7. A secondary battery comprising:
a unit cell including an electrode assembly provided with a tab bundle and having a round portion formed at each of two ends thereof in a direction in which the tab bundle is located, and two separate caps, each cap covering one of the round portions of the electrode assembly,
wherein each cap includes a pair of first surfaces which are directed in parallel to an upper surface and a lower surface of the electrode assembly, a pair of second surfaces which are directed in parallel to both side surfaces of the electrode assembly, one third surface which connects the pair of first surfaces and the pair of second surfaces, and a contact body provided in an internal space formed by the pair of first surfaces, the pair of second surfaces, and the one third surface, the contact body having a round surface arranged to be in contact with the round portion of the electrode assembly, the contact body including another surface opposite the round surface,
wherein the third surface is provided with a through hole through which the tab bundle passes, and
wherein a first space for gas capturing is provided between the third surface and the another surface of the contact body.

8. The secondary battery according to claim 7, wherein the first space has a slit shape formed in a length direction of the contact body.

9. The secondary battery according to claim 7, wherein each cap is made of at least one of an insulating rubber material and a chemical-resistant plastic material.

10. The secondary battery according to claim 9, wherein each cap is made of styrene-butadiene rubber or acrylonitrile-butadiene rubber.

11. The secondary battery according to claim 7, wherein the unit cell further includes a case for accommodating the electrode assembly on which each cap is provided.

12. The secondary battery according to claim 11, wherein a plurality of unit cells is stacked.

13. The secondary battery according to claim 7, wherein a plurality of unit cells is stacked, and a second space is provided between the electrode assemblies.

14. The secondary battery according to claim 13, wherein a fixing agent is interposed between the first surfaces of each cap so that the unit cells are able to be fixed to each other.

15. The secondary battery according to claim 14, wherein the fixing agent is an adhesive.

16. The secondary battery according to claim 15, wherein the secondary battery is a battery module or a battery pack.

* * * * *